(12) United States Patent
Bradley

(10) Patent No.: US 7,886,799 B2
(45) Date of Patent: Feb. 15, 2011

(54) LAMINATING DEVICE

(75) Inventor: Samuel J. Bradley, Mundelein, IL (US)

(73) Assignee: ACCO UK Limited, Aylesbury (GB)

( * ) Notice: Subject to any disclaimer, the term of this patent is extended or adjusted under 35 U.S.C. 154(b) by 0 days.

(21) Appl. No.: 12/683,922

(22) Filed: Jan. 7, 2010

(65) Prior Publication Data

US 2010/0175835 A1 Jul. 15, 2010

(30) Foreign Application Priority Data

Jan. 13, 2009 (GB) ................................ 0900476.3

(51) Int. Cl.
*B32B 37/00* (2006.01)
(52) U.S. Cl. .................... 156/555; 156/368; 156/582
(58) Field of Classification Search .............. 156/367, 156/368, 555, 580, 582, 583.1; 100/327, 100/160, 176
See application file for complete search history.

(56) References Cited

U.S. PATENT DOCUMENTS

| | | | |
|---|---|---|---|
| 4,302,276 A * | 11/1981 | Schulze | 156/553 |
| 4,387,000 A * | 6/1983 | Tancredi | 156/495 |
| 5,728,257 A * | 3/1998 | Lee | 156/555 |
| 5,810,965 A | 9/1998 | Fwu | |
| 6,874,555 B1 | 4/2005 | Hsiao | |
| 6,938,661 B2 | 9/2005 | Cheng | |
| 7,013,945 B2 | 3/2006 | Kim | |
| 7,406,993 B2 * | 8/2008 | Lin | 156/555 |
| 7,556,077 B2 * | 7/2009 | Chou | 156/555 |
| 2002/0117266 A1 | 8/2002 | Han | |
| 2006/0162841 A1 | 7/2006 | Hong | |
| 2006/0180276 A1 | 8/2006 | Lin | |

FOREIGN PATENT DOCUMENTS

DE 10056068 5/2002
JP 2003334858 11/2003

OTHER PUBLICATIONS

United Kingdom search report for GB0900476.3, Sep. 15, 2009, 1 page.

* cited by examiner

*Primary Examiner*—James Sells
(74) *Attorney, Agent, or Firm*—Michael Best & Friedrich LLP

(57) ABSTRACT

A laminating device includes first and second rollers, a motor, a first drive element associated with the motor and configured to be driven thereby, a second drive element associated with at least one of the rollers, and adapted to engage the first drive element so that the motor may drive the rollers to rotate in respective first directions, and a support arrangement which at least partially supports at least one of the rollers and the second drive element. The support arrangement is movable with respect to the first drive element between a first position, in which the first and second drive elements engage one another, and a second position, in which the first and second drive elements are disengaged from one another, allowing rotation of the rollers in respective second directions without this motion being transmitted to the motor.

12 Claims, 2 Drawing Sheets

LAMINATING DEVICE

BACKGROUND

The present invention relates to a laminating device, and in particular concerns a laminating device from which an object can be withdrawn by a user in the event of a jam or mis-feed.

Laminating machines are well known. In a typical laminating machine, a pair of rollers are provided which lie close to, or touch, one another, presenting a "nip" through which objects to be laminated may pass. The rollers are typically heated, and this heat allows the sealing of objects, for instance sheets of paper or card which are placed in plastic pouches and fed between the rollers.

The rollers are typically driven to rotate in opposite directions, so that objects to be laminated are drawn between the rollers. However, it is not uncommon for an object, such as a pouch, to jam in position when partially fed through the rollers. This may occur because the pouch is too thick to pass between the rollers, or because the pouch has been fed into the laminating device at an angle. In conventional laminating devices it can be awkward to remove an object which is jammed in this way. Attempting to grasp a rear part of the object and pull it back out of the laminating device requires a great deal of strength, since the user must rotate the rollers against the driving force provided by the motor. Even if the motor is switched off, or power to the laminating device is stopped, it is still likely to be difficult for a user to drag an object back through the rollers, as it will be necessary to overcome a great deal of friction to "back-drive" the motor.

It has been proposed, for instance in U.S. Pat. No. 6,874,555, to provide a laminating device in which the rollers can be decoupled from the motor in order to allow a jammed object to be removed from between the rollers more easily. This US patent discloses a device having a lever, a drive cog being mounted at one end of the lever and the other end being provided with a handle that may be depressed by a user. When a user operates the lever, the drive cog is physically separated from a further cog, thus decoupling the motor from the rollers.

SUMMARY

The invention provides an improved laminating device. Accordingly, one aspect of the present invention provides a laminating device including first and second rollers, a motor, a first drive element associated with the motor and configured to be driven thereby, a second drive element associated with at least one of the rollers, and adapted to engage the first drive element so that the motor may drive the rollers to rotate in respective first directions, and a support arrangement which at least partially supports at least one of the rollers and the second drive element. The support arrangement is movable with respect to the first drive element between a first position, in which the first and second drive elements engage one another, and a second position, in which the first and second drive elements are disengaged from one another, allowing rotation of the rollers in respective second directions without this motion being transmitted to the motor.

In one embodiment, the support arrangement can comprise a pair of supports provided at each end of the rollers.

In one embodiment, the laminating device has a normal feed direction, being the direction in which objects to be laminated are normally passed between the rollers, and wherein the support arrangement may be moved from the first position to the second position by a force applied to one or both of the rollers in a direction which is substantially opposite to the feed direction.

The support arrangement can be adapted to move pivotally between the first position and the second position.

The support arrangement can be adapted to move translationally between the first position and the second position.

The support arrangement can be biased into the first position.

In one embodiment, the laminating device further comprises a clutch arrangement which provides relatively little resistance to rotation of at least one of the rollers in a first direction, and provides greater resistance to the rotation of the at least one of the rollers in the opposite direction. The first direction is the direction of rotation of the roller during a normal laminating operation.

In one embodiment, the laminating device comprises a detection arrangement to detect the movement of the support arrangement from the first position to the second position. The detection arrangement can comprise a switch. The motor can be stopped when it is detected that the support arrangement has moved from the first position to the second position. When the support arrangement is detected to have moved from the first position to the second position, power to the motor is shut off for a pre-set length of time.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
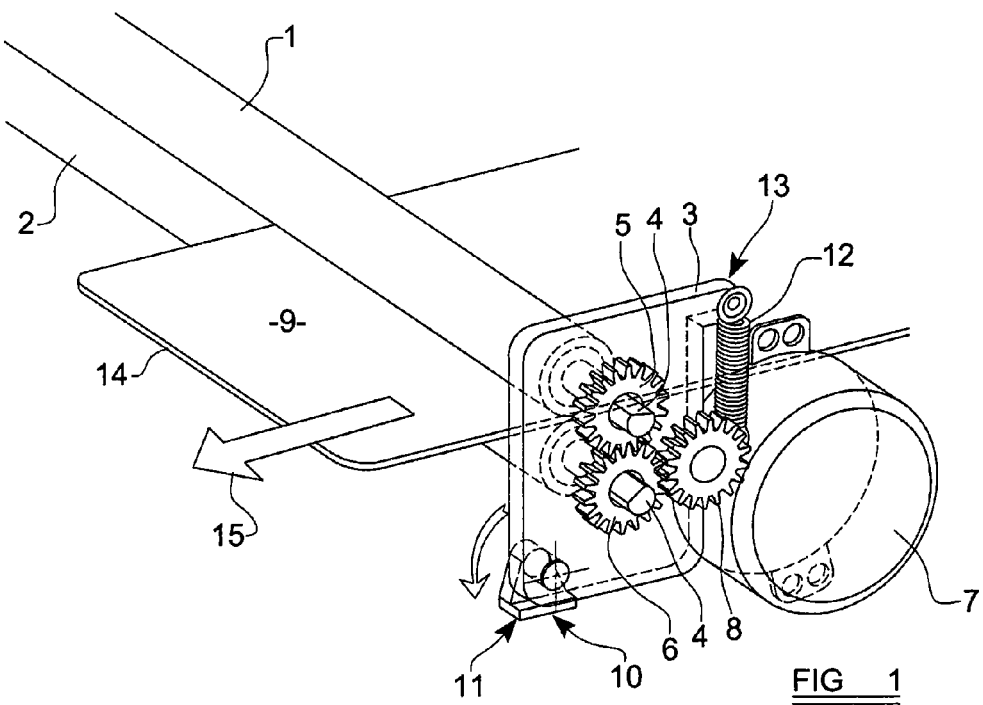
FIGS. 1 and 2 show components of a laminating device embodying the present invention in first and second configurations.

Referring firstly to FIG. 1, components of a laminating device embodying the present invention are shown. The device comprises upper and lower rollers 1,2, which are mounted to be parallel with one another. The rollers 1,2 are preferably mounted so that there is a small gap therebetween, of a suitable width to accept a laminating pouch. In alternative embodiments, one of the rollers 1,2 may be movably mounted with respect to, and biased towards, the other of the rollers 1,2. This means that the rollers 1,2 can be forced apart by objects passing therebetween, and allows the rollers 1,2 to accommodate objects of varying thicknesses, as is known in the art.

The rollers 1,2 are mounted within a housing (not shown) which includes a feed slot into which objects can be inserted so as to pass between the rollers 1,2, and an exit slot through which objects may leave the device after passing between the rollers 1,2. A heating arrangement (not shown) is also provided to heat the rollers 1,2 to an operating temperature.

At each end thereof, both rollers 1,2 are mounted to respective mounting plates 3 (only one of which is shown in FIG. 1), the planes of which are substantially perpendicular to the longitudinal axes of the rollers 1,2. The rollers 1,2 may be mounted to the mounting plates 3 in any suitable manner, for instance by passing through bearings which are supported in apertures formed through the mounting plates 3.

Central shafts 4 of the rollers 1,2 protrude through a first one of the mounting plates 3, and respective first and second cogs or gears 5,6 are provided on the protruding parts of the central shafts 4. The first and second cogs 5,6 are of suitable dimensions that they mesh with one another, and it will therefore be understood that the rollers 1,2 are constrained only to rotate in opposite directions to one another.

A motor 7 is also mounted within the housing, and has a drive shaft (not shown) which rotatably drives a drive cog or gear 8, which meshes with the second cog 6.

It will therefore be understood that, when the motor 7 is operated to drive the drive cog 8, this will drive the second cog 6 to rotate in one direction, which will in turn drive the first cog 5 to rotate in the opposite direction. This will cause the rollers 1,2 to rotate in opposite directions, allowing an object such as a pouch 9 to be drawn between the rollers 1,2 in a feed direction (which is left-to-right in FIG. 1).

At a bottom edge 10 thereof closest to the feed slot, each of the support plates 3 is connected to a bottom surface of the housing by pivotal connections 11. These pivotal connections 11 allow the support plates 3 to pivot about axes which are substantially perpendicular to the longitudinal axes of the rollers 1,2. At least one (and preferably both) of the support plates 3 is, however, biased into the default state described above, in which the drive cog 8 meshes with the second cog 6, by a spring 12, which is connected at one end to an upper edge 13 of the support plate 3 which is furthest from the feed slot and is attached at its other end to a anchoring point, such as the motor 7 or a lower surface of the housing. Any other suitable biasing arrangement may be provided to bias the mounting plates 3 into this state, however.

Use of the laminating device will now be described. The motor 7 is activated, so that the rollers 1,2 counter-rotate. A pouch 9 is then fed into the feed slot so that it passes between the rollers 1,2, in the feed direction, and is drawn between the rollers 1,2 by their rotational motion.

The pouch 9 may jam between the rollers 1,2, however, when it has only partly passed between them. If this occurs, a user of the device may grasp a rear edge 14 of the pouch 9, and pull the pouch 9 in a rearward direction, i.e. opposite to the feed direction. In FIG. 1, an arrow 15 indicates the direction of this pulling force.

As described above, a relatively large force is required to "back-drive" the rollers 1,2 against the motor 7. The rollers 1,2 will, therefore, present considerable resistance to rotation in response to the withdrawal of the pouch 9 in this manner.

Figure 2:
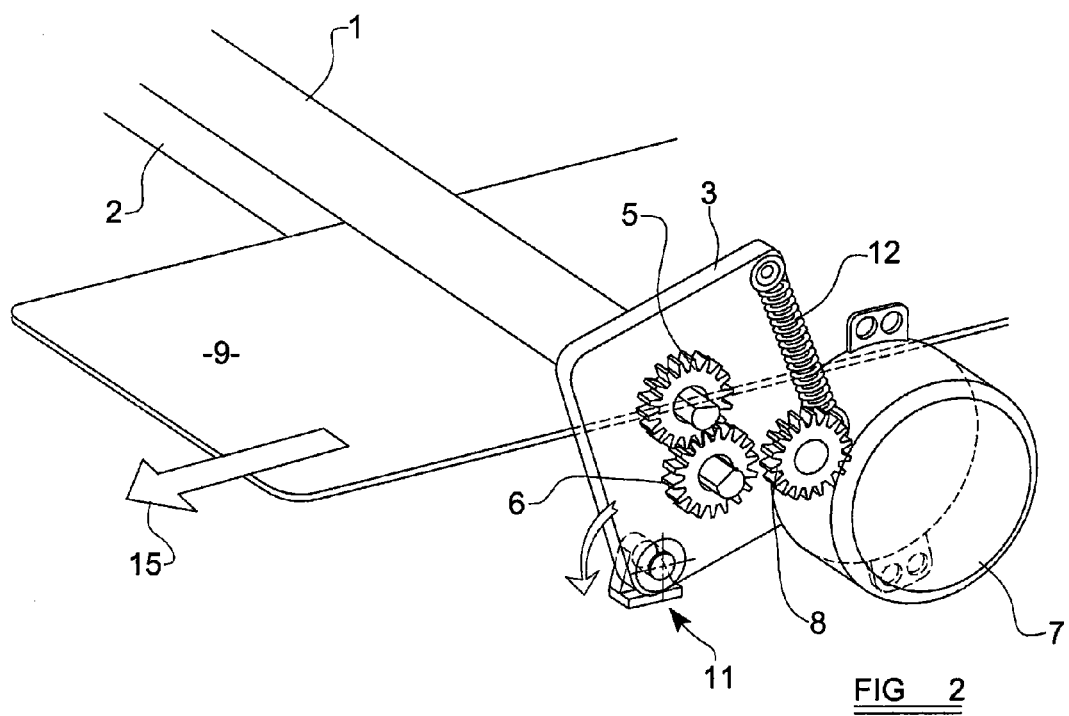

The pulling force exerted on the pouch 9 will exert a rearward force on the rollers 1,2, and will therefore cause the mounting plates 3 to tilt about the pivotal connections 11, so that the rollers 1,2 are pulled backwardly towards the feed slot by the pulling force, as shown in FIG. 2. As this occurs, the second cog 6 (which is fixed in position relative to the mounting plates 3) will be pulled out of engagement with the drive cog 8, thus decoupling the rollers 1,2 from the motor 7 and allowing the rollers 1,2 to rotate much more freely, and hence allowing the pouch 9 to be withdrawn from between the rollers 1,2 with relative ease. The rollers 1,2 will preferably not rotate in an entirely friction-free manner, however, and hence the pulling force that is exerted on the pouch 9 should be sufficient to maintain the mounting plates 3 in their tilted orientation as the pouch 9 is withdrawn.

When the pouch 9 has been withdrawn from between the rollers 1,2, the mounting plates 3 will return to their initial positions under the influence of the spring 12, and the second cog 6 will re-engage the drive cog 8, causing the rollers 1,2 to be driven once again so as to draw objects between the rollers 1,2 in the feed direction.

It will be appreciated that this arrangement confers several advantages over conventional laminating machines of this type. In particular, a user does not need to perform two operations to withdraw a jammed pouch easily, such as lifting a lever and then withdrawing the pouch. Instead, the user may simply grasp the pouch and pull it back out of the laminating device, with no further operations being necessary. It is also not necessary for the user to switch off the laminating machine in order to do this.

Figure 3:
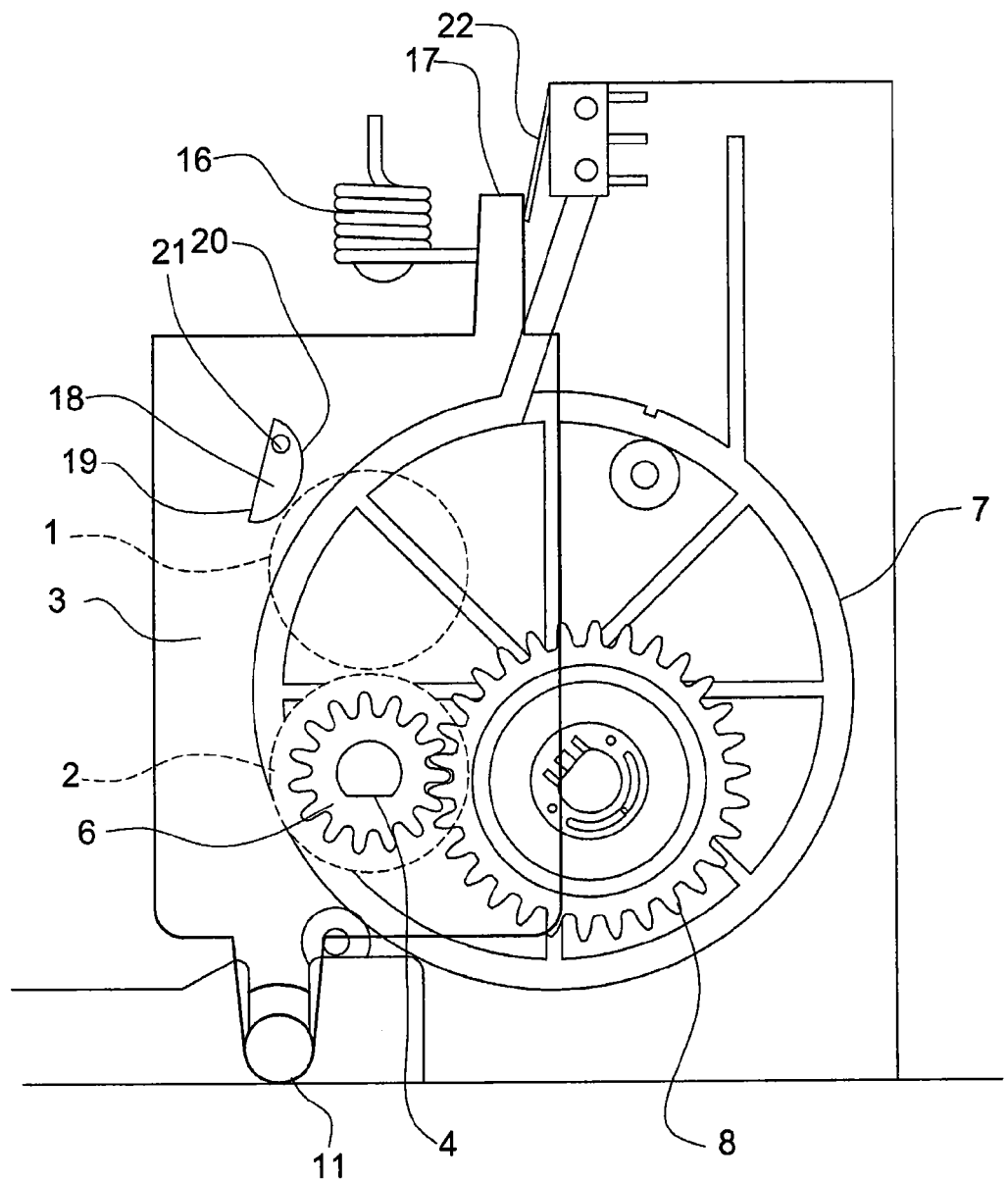
FIG. 3 shows components of a further laminating device embodying the present invention.

Turning to FIG. 3, components of a further laminating device embodying the present invention are shown. In common with the embodiment described above, the further laminating device has upper and lower rollers 1,2, having respective cogs 6 (only the lower one of which is shown in FIG. 3) mounted on protruding shafts 4 at one end of the rollers 1,2 which protrude through a mounting plate 3 (it should be understood that a corresponding mounting plate may be provided at the other end of the rollers).

A motor 7 is provided within the housing, having a drive cog 8 which is driven to rotate with the drive shaft of the motor 7.

Once again, the mounting plate 3 is mounted on a pivotal connection 11 at a lower corner thereof, so that the mounting plate 3 can pivot between a default drive position (as shown in FIG. 3), in which the second cog 6 meshes with the drive cog 8, and a release position, in which the mounting plate 3 is tilted rearwardly so that the second cog 6 is separated from the drive cog 8, and therefore the rollers 1,2 are decoupled from the motor 7. In this embodiment, the mounting plate 3 is biased into the drive position by a spring 16, one end of which is attached to a lug 17 which protrudes upwardly from an upper surface of the mounting plate 3, and the other end of which is attached to an inner wall (not shown) of the housing in the vicinity of the lug 17.

In this embodiment, a resistance clutch 18 is provided. The resistance clutch 18 takes the form of an elongate bar having a generally semi-elliptical cross-section, having a flat surface 19 and a rounded surface 20. The clutch 18 is suspended on an elongate pin 21 that is rotatably received in a corresponding recess (not shown) in the support plate 3 and extends generally parallel to the rollers 1,2. The pin 21 passes through the clutch 18 near one end thereof, so that the clutch 18 hangs downwardly from the pin 21 under its own weight. The clutch 18 is provided above a rear side portion of the upper roller 1 (i.e. the side of the upper roller 1 closest to the feed slot), so that the curved surface 20 of the clutch 18 rests against an upper rear surface of the upper roller 1.

When the rollers 1,2 are rotated by the motor 7 during normal use, the clutch 18 will provide only very little resistance to the motion of the upper roller 1, as the surface of the upper roller 1 will be moving outwardly and rearwardly as it passes the point of contact with the clutch 18, and will therefore tend to push the clutch 18 downwardly away from its supporting pin 21, so that the clutch 18 is pushed away from the surface of the upper roller 1.

If a pouch (not shown) jams between the rollers 1,2 and is pulled back by a user to withdraw the pouch from the laminating device, however, the rollers 1,2 will rotate in the opposite direction, i.e. the upper roller 1 will rotate clockwise, as shown in FIG. 3. In this case, at the point where the surface of the upper roller 1 contacts the curved surface 20 of the clutch 18, the surface of the upper roller 1 will tend to push the surface 20 of the clutch 18 towards the supporting pin 21, and the clutch 18 will therefore be "pinched" between the supporting pin 21 and the point of contact with the upper roller 1. Rotation of the upper roller 1 will therefore only be possible through slippage between the surfaces of the clutch 18 and the roller 1, but since the surfaces of these components will be pressed together relatively tightly, large frictional forces will need to be overcome. The clutch 18 will therefore resist rotation of the upper roller 1 in this direction much more strongly than in the normal drive direction.

Therefore, as a user pulls a jammed pouch backwards through the laminating device to release the pouch, the presence of the clutch 18 will mean that the rollers 1,2 will not spin round freely, and the support plate 3 will therefore not be pulled back into the drive position too easily by the spring 16. If the rollers 1,2 were allowed to rotate too freely with respect to one another during this operation, the support plate 3 may fall back into its normal, drive position partway through the removal of the pouch, thus re-engaging the second cog 6 with the drive cog 8 and bringing the removal to an abrupt halt.

Any suitable clutch arrangement may be used to exert greater resistance to rotation at one or both of the rollers 1,2 in one direction than in the other, and the skilled person will be aware of several alternative ways in which this can be achieved.

Also included in the embodiment shown in FIG. 3 is a microswitch 22, which is engaged by the lug 17 of the support plate 3 when the support plate 3 is in its normal position. When the support plate 3 is pivoted by a user pulling on an object which is jammed between the rollers 1,2, the lug 17 ceases to engage the microswitch 22, and the pivoting can therefore be is sensed by the microswitch 22.

In certain embodiments of the invention, the disengagement of the lug 17 from the microswitch 22 may shut off power to the motor 7. In these embodiments, therefore, when the support plate 3 is tilted by a user withdrawing an item from between the rollers 1,2, the motor 7 will stop. When the item has been withdrawn and the support plate 3 returns to its initial position, the lug 17 will contact the microswitch 22 and the motor 7 will begin turning again.

In alternative embodiments, the removal of the lug 17 from the microswitch 22 may deactivate the motor 7 for a pre-set length of time. This length of time may be around two seconds, or may be a longer period such as three to five seconds, although the invention is not, of course, limited to these periods.

This feature has two main advantages. A first one is that, if a user pulls a jammed object gently, and the friction required to rotate the rollers 1,2 in the "reverse" direction is relatively low, the support plate 3 may repeatedly fall back into its default position as the object is withdrawn. If the motor 7 continued turning throughout this operation, or if the motor 7 was activated whenever the support plate 3 was detected to be in its default position by the microswitch 22, the second cog 6 would continually re-engage the drive cog 8 of the motor 7 and be driven thereby, causing the jammed object to be drawn further into the laminating device. The user would also experience a "jerky" withdrawal.

The second advantage relates to the re-engagement of the second cog 6 with the drive cog 8 when the withdrawal is complete. If the motor 7 is rotating as these cogs 6,8 come into contact with one another, this may lead to a jolt if the teeth of the cogs 6,8 are not aligned to mesh with one another. In these embodiments of the invention, the time delay will mean that the motor 7 is likely not to be turning when the second cog 6 re-engages the drive cog 8. These cogs 6,8 will therefore already be engaged with one another when the motor 7 starts to turn again, reducing the possibility of a jolt as the cogs 6,8 re-engage.

In the above-described embodiments, the support plates 3 are moved in a tilting manner when a withdrawing force is applied to a jammed object. However, in other embodiments of the invention, the support plates 3 may be configured to slide directly away from the drive cog 8, so that the second cog 6 thereof disengages the drive cog 8 without the support plates 3 performing a rotational motion. In still further embodiments, a combination of sliding and rotating may occur, or indeed any other suitable motion that allows disengagement of the rollers 1,2 from the motor 7 may occur.

While two separate mounting plates are described above, it should be understood that any suitable mounting arrangement, such as an integral support cradle, may be used to mount and support the rollers.

While the above embodiments have been described in relation to laminating devices, skilled users will appreciate that there are other applications in which items are drawn between motor-driven rollers, and may need to be withdrawn due to a jam. The present invention may be applied to any device in which objects are drawn between rotatable rollers, and other such devices may include printing machines, presses, powered mangles and the like.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

Various features and advantages of the invention are set forth in the following claims.

The invention claimed is:

1. A laminating device comprising:
   first and second rollers;
   a motor;
   a first drive element associated with the motor and configured to be driven thereby;
   a second drive element associated with at least one of the rollers, and adapted to engage the first drive element so that the motor may drive the rollers to rotate in respective first directions; and
   a support arrangement which at least partially supports at least one of the rollers and the second drive element, the support arrangement being movable with respect to the first drive element between a first position, in which the first and second drive elements engage one another, and a second position, in which the first and second drive elements are disengaged from one another, allowing rotation of the rollers in respective second directions without this motion being transmitted to the motor.

2. A laminating device according to claim 1, wherein the support arrangement comprises a pair of supports provided at each end of the rollers.

3. A laminating device according to claim 1, having a normal feed direction, being the direction in which objects to be laminated are normally passed between the rollers, and wherein the support arrangement may be moved from the first position to the second position by a force applied to one or both of the rollers in a direction which is substantially opposite to the feed direction.

4. A laminating device according to claim 1, wherein the support arrangement is adapted to move pivotally between the first position and the second position.

5. A laminating device according to claim 1, wherein the support arrangement is adapted to move translationally between the first position and the second position.

6. A laminating device according to claim 1, wherein the support arrangement is biased into the first position.

7. A laminating device according to claim 1, further comprising a clutch arrangement which provides relatively little resistance to rotation of at least one of the rollers in a first direction, and provides greater resistance to the rotation of the at least one of the rollers in the opposite direction.

8. A laminating device according to claim 7, wherein the first direction is the direction of rotation of the roller during a normal laminating operation.

9. A laminating device according to claim 1, comprising a detection arrangement to detect the movement of the support arrangement from the first position to the second position.

10. A laminating device according to claim 9, wherein the detection arrangement comprises a switch.

11. A laminating device according to claim 9, wherein the motor is stopped when it is detected that the support arrangement has moved from the first position to the second position.

12. A laminating device according to claim 9, wherein, when the support arrangement is detected to have moved from the first position to the second position, power to the motor is shut off for a pre-set length of time.

* * * * *